(12) United States Patent
Achten et al.

(10) Patent No.: US 7,645,833 B2
(45) Date of Patent: Jan. 12, 2010

(54) CROSSLINKABLE COMPOSITIONS, PROCESSES FOR THE PREPARATION THEREOF AND THE USE THEREOF

(75) Inventors: Dirk Achten, Köln (DE); Claus Wrana, Köln (DE); Christopher Ong, Leverkusen (DE); Martin Mezger, Burscheid (DE); Hans Magg, Kürten (DE); Jürgen Ismeier, Forstinning (DE); Hans-Rafael Winkelbach, Burscheid (DE)

(73) Assignee: LANXESS Deutschland GmbH, Leverkusen (DE)

( * ) Notice: Subject to any disclaimer, the term of this patent is extended or adjusted under 35 U.S.C. 154(b) by 72 days.

(21) Appl. No.: 11/526,544

(22) Filed: Sep. 25, 2006

(65) Prior Publication Data

US 2009/0292064 A1 Nov. 26, 2009

(30) Foreign Application Priority Data

Sep. 30, 2005 (DE) .................. 10 2005 047 115

(51) Int. Cl.
*C08L 77/00* (2006.01)
*C08L 9/02* (2006.01)

(52) U.S. Cl. ............... 525/230; 525/232; 525/233; 525/238; 525/387; 526/335; 526/341

(58) Field of Classification Search ......... 525/230, 525/232, 233, 238, 381; 526/335, 341
See application file for complete search history.

(56) References Cited

U.S. PATENT DOCUMENTS

| 3,700,637 | A | 10/1972 | Finch, Jr. ............. 260/83.3 |
| 4,464,515 | A | 8/1984 | Rempel et al. ............. 525/338 |
| 4,503,196 | A | 3/1985 | Rempel et al. ............. 525/338 |
| 4,581,417 | A | 4/1986 | Buding et al. ............. 525/338 |
| 4,631,315 | A | 12/1986 | Buding et al. ............. 525/338 |
| 4,746,707 | A | 5/1988 | Fiedler et al. ............. 525/338 |
| 4,795,788 | A | 1/1989 | Himmler et al. ............. 525/338 |
| 4,952,634 | A | 8/1990 | Grossman ............. 525/190 |
| 4,978,771 | A | 12/1990 | Fiedler et al. ............. 558/459 |
| 5,157,083 | A | 10/1992 | Aonuma et al. ............. 525/285 |
| 6,683,136 | B2 | 1/2004 | Guo et al. ............. 525/329.3 |
| 7,396,884 | B2 * | 7/2008 | Achten ............. 525/387 |
| 2003/0065076 | A1 | 4/2003 | Hellens et al. ............. 524/397 |
| 2003/0181558 | A1 | 9/2003 | von Hellens ............. 524/394 |
| 2004/0258937 | A1 | 12/2004 | Achten et al. ............. 428/500 |

FOREIGN PATENT DOCUMENTS

| DE | 25 39 132 | 3/1977 |
| EP | 0 298 386 | 7/1988 |
| EP | 0 471 250 | 2/1992 |
| EP | 0 933 381 | 5/2003 |
| WO | 01/77185 | 10/2001 |

* cited by examiner

*Primary Examiner*—Robert D. Harlan
(74) *Attorney, Agent, or Firm*—Jennifer R. Seng

(57) ABSTRACT

Novel crosslinkable compositions based on elastomers, at least one of which has carboxyl and/or carboxylate groups, are provided, these crosslinkable compositions containing special unsaturated organic salts of metal ions and a crosslinking system which acts as a free radical donor. Crosslinked elastomers which have excellent physical properties are obtainable therefrom. The novel crosslinkable compositions have a wide range of uses.

39 Claims, No Drawings

CROSSLINKABLE COMPOSITIONS, PROCESSES FOR THE PREPARATION THEREOF AND THE USE THEREOF

FIELD OF THE INVENTION

The invention relates to crosslinkable compositions which contain elastomers which have carboxyl- and/or carboxylate groups, and special organic salts of metal ions and a crosslinking system based on free-radical donors. The invention furthermore relates to the preparation of such crosslinkable compositions and the use thereof.

BACKGROUND OF THE INVENTION

There is a demand for vulcanizable compositions which can be processed in liquid form, or as far as possible solvent-free or have a low solvent content and, after curing or vulcanization, have the typical properties of vulcanized elastomers. There is particular requirement for materials which can be processed in low-viscosity form and, after vulcanization, have high thermal stability and adjustable physical properties and hence combine the properties of customary systems processable in liquid form, such as silicone rubbers or polyurethanes with the properties of high-performance elastomers, such as, for example, HNBR, EVM, ACM and AEM rubbers. There is also a particular need for materials which firstly have a very low viscosity at high temperatures or under high shearing but secondly are provided with sufficient stability under load at room temperature. This combination of properties would mean that on the one hand they can be moulded by customary methods (extrusion, injection, calendering, pressing) to give bodies which are dimensionally stable for a short time at room temperature, such as, for example, hides, lining strips or lining bodies, and can be used as such but aquire a low viscosity at higher temperatures and can then typically be processed "in liquid form".

An object of the present invention is therefore to provide compositions which have low viscosities at the processing temperature while at the same time stability under load at room temperature and furthermore high thermal stability and a high level of physical properties after vulcanization.

SUMMARY OF THE INVENTION

Surprisingly, it was found that, by combining elastomers containing carboxyl and/or carboxylate groups, in a defined viscosity range, with special unsaturated carboxylic acid salts of metal ions and a free radical crosslinking system, vulcanizable compositions are obtained which have the desired property profile, achieve the object according to the invention and, after subsequent vulcanization of the elastomers or polymerization of the unsaturated carboxylic acid salts, lead to vulcanizates which meet the abovementioned requirements in that they are simultaneously high-strength and elastic products which have a high adhesive effect with respect to metals and customary polar substrates, such as polyurethanes, polyamides, polyesters, polyethers, polyepoxides, polyalcohols, polyacids and derivatives and mixtures thereof.

DETAILED DESCRIPTION OF THE INVENTION

The present invention relates to crosslinkable compositions containing
(1) one or more elastomers, at least one thereof having carboxyl and/or carboxylate groups,
(2) one or more different salts of the general formula (I)

in which
$R^{y-}$ represents an $\alpha,\beta$-unsaturated $C_3$-$C_{14}$-carboxylate which contains y carboxylate groups,
y may represent the values 1, 2, 3 or 4,
x is 2, 3 or 4 and
M is a divalent, trivalent or tetravalent metal and,
(3) one or more crosslinking agents which act as free radical donors,
wherein
(a) the elastomer (1) or, if a plurality of elastomers (1) is used, the mixture of all elastomers (1) together has a Mooney viscosity (ML 1+4 at 100° C.), measured according to ASTM standard D 1646, in a range of 1-35 and
(b) the crosslinkable composition
(i) has a complex viscosity $\eta^*$, measured in a Rubber Process Analyzer (RPA) at 60° C., 1 Hz and an amplitude of 10%, of greater than 30 000 Pas,
(ii) an amplitude-dependent change of the complex viscosity, measured in the RPA at 60° C. as the ratio of $\eta^*$ (at 1 Hz and 10% amplitude) to $\eta^*$ (at 1 Hz and 100% amplitude), of greater than 1.4,
(iii) a temperature-dependent change of the complex viscosity, measured in the RPA as the ratio of $\eta^*$ (at 60° C., 1 Hz and 10% amplitude) to $\eta^*$ (at 130° C., 1 Hz and 10% amplitude), of greater than 6 and
(iv) an amplitude-dependent change of the complex viscosity, measured in the RPA at 130° C. as the ratio of $\eta^*$ (at 1 Hz and 10% amplitude) to $\eta^*$ (at 1 Hz and 100% amplitude), of less than 1.5,
the values stated for the complex viscosity ($\eta^*$) in all abovementioned cases (i)-(iv) indicate in each case the mathematical magnitude of the complex viscosity.

All abovementioned complex viscosities are measured in a Rubber Process Analyzer (RPA 2000) from Alpha Technologies under the conditions stated in each case. The Rubber Process Analyzer of Alpha Technologies and the operation thereof are clearly known to the person skilled in the art. It is an oscillation rheometer for investigating the viscoelastic properties and the processing behaviour of rubber mixtures.

Preferred crosslinkable compositions are those containing
(1) 10-94% by weight of one or more elastomers, at least one thereof having carboxyl and/or carboxylate groups,
(2) 5-89% by weight of one or more salts of the general formula (I)

in which
$R^{y-}$ represents an $\alpha,\beta$-unsaturated $C_3$-$C_{14}$-carboxylate which contains y carboxylate groups,
y may represent the values 1, 2, 3 or 4,
x is 2, 3 or 4 and
M is a divalent, trivalent or tetravalent metal, and
(3) 1-20% by weight of one or more crosslinking agents which act as free radical donors, the sum of the components (1), (2) and (3) being less than or equal to 100% by weight,
wherein
(a) the elastomer (1) or, if a plurality of elastomers (1) is used, the mixture of all elastomers (1) together has a Mooney-viscosity (ML 1+4 at 100° C.), measured according to ASTM standard D 1646, in a range of 1-35 and (b) the crosslinkable composition
  (i) has a complex viscosity η*, measured in a Rubber Process Analyzer (RPA) at 60° C., 1 Hz and an amplitude of 10%, of greater than 30 000 Pas,
  (ii) an amplitude-dependent change of the complex viscosity, measured in the RPA at 60° C. as the ratio of η* (at 1 Hz and 10% amplitude) to η* (at 1 Hz and 100% amplitude), of greater than 1.4,
  (iii) a temperature-dependent change of the complex viscosity, measured in the RPA as the ratio of η* (at 60° C., 1 Hz and 10% amplitude) to η* (at 130° C., 1 Hz and 10% amplitude), of greater than 6,
  (iv) an amplitude-dependent change of the complex viscosity, measured in the RPA at 130° C. as the ratio of η* (at 1 Hz and 10% amplitude) to η* (at 1 Hz and 100% amplitude), of less than 1.5, and
  the values stated for the complex viscosity (η*) in all abovementioned cases (i)-(iv) indicating in each case the mathematical magnitude of the complex viscosity.

Particularly preferred crosslinkable compositions are those containing
(1) 30-84% by weight of one or more elastomers, at least one thereof having carboxyl and/or carboxylate groups,
(2) 14-68% by weight of one or more salts of the general formula (I)

in which
  $R^{y-}$ represents an α,β-unsaturated $C_3$-$C_{14}$-carboxylate which contains y carboxylate groups,
  y may represent the values 1, 2, 3 or 4,
  x is 2, 3 or 4 and
  M is a divalent, trivalent or tetravalent metal, and
(3) 2-15% by weight of one or more crosslinking agents as radical donors, the sum of the components (1), (2) and (3) being less than or equal to 100% by weight,
wherein
  (a) the elastomer (1) or, if a plurality of elastomers (1) is used, the mixture of all elastomers (1) together has a Mooney-viscosity (ML 1+4 at 100° C.), measured according to ASTM standard D 1646, in a range of 1-35 and
  (b) the crosslinkable composition has
  (c)
    (i) a the values stated for the complex viscosity η*, in all abovementioned cases indicate in each case the mathematical magnitude of the complex viscosity- .complex viscosity η* measured in a Rubber Process Analyzer (RPA) at 60° C., 1 Hz and an amplitude of 10%, of greater than 30 000 Pas,
    (ii) an amplitude-dependent change of the complex viscosity, measured in the RPA at 60° C. as the ratio of η* (at 1 Hz and 10% amplitude) to η* (at 1 Hz and 100% amplitude), of greater than 1.4,
  (d) a temperature-dependent change of the complex viscosity, measured in the RPA as the ratio of η* (at 60° C., 1 Hz and 10% amplitude) to η* (at 130° C., 1 Hz and 10% amplitude), of greater than 6,
  an amplitude-dependent change of the complex viscosity, measured in the RPA at 130° C. as the ratio of η* (at 1 Hz and 10% amplitude) to η* (at 1 Hz and 100% amplitude), of less than 1.5, and In all abovementioned embodiments, the crosslinkable compositions according to the invention can optionally contain, as component(s) (4), up to 84% by weight, preferably 4-64% by weight and particularly preferably 10-40% by weight of one or more further auxiliaries, such as, for example, fillers, fibres, polymers which are not covered by the definition according to the invention of the elastomer (1), oils, stabilizers, processing auxiliaries, plasticizers, additional polymerizable monomers, dimers, trimers or oligomers, or vulcanization activators, the sum of the components (1), (2), (3) and (4) being 100% by weight.

The crosslinkable compositions according to the invention are distinguished in that they resemble Newtonian fluids in their properties. This means that they do not show any significant change of the complex viscosity (in this application, the mathematical magnitude of the complex viscosity is always stated for this) with shearing at the processing temperature (e.g. 130° C.). At room temperature, however, crosslinkable compositions show substantially higher viscosities than at the processing temperature and clear non-Newtonian behaviour on shearing, i.e. a decrease in the viscosity with shearing.

Crosslinkable compositions according to the invention have
  (i) a complex viscosity η*, measured in a Rubber Process Analyzer (RPA) at 60° C., 1 Hz and an amplitude of 10%, of greater than 30 000 Pas, preferably of greater than 40 000 Pas,
  (ii) an amplitude-dependent change of the complex viscosity, measured in the RPA at 60° C. as the ratio of η* (at 1 Hz and 10% amplitude) to η* (at 1 Hz and 100% amplitude), of greater than 1.4, preferably of greater than 1.6,
  (iii) a temperature-dependent change of the complex viscosity, measured in the RPA as the ratio of η* (at 60° C., 1 Hz and 10% amplitude) to η* (at 130° C., 1 Hz and 10% amplitude), of greater than 6, preferably of greater than 8,
  (iv) an amplitude-dependent change of the complex viscosity, measured in the RPA at 130° C. as the ratio of η* (at 1 Hz and 10% amplitude) to η* (at 1 Hz and 100% amplitude), of less than 1.5, preferably of less than 1.4, and
  the values stated for the complex viscosity (η*) in all abovementioned cases (i)-(iv) indicate in each case the mathematical magnitude of the complex viscosity.

The value of greater than 1.4, preferably of greater than 1.6, for the amplitude-dependent change of the complex viscosity (ii) (reduction of the viscosity), measured in the RPA at 60° C. as the ratio η* (at 1 Hz and 10% amplitude) to η* (at 1 Hz and 100% amplitude), means that a typical behaviour of a filled rubber mixture having non-Newtonian behaviour is present.

The value of greater than 6, preferably of greater than 8, for the temperature-dependent change of the complex viscosity (iii) (reduction of the viscosity), measured in the RPA as the ratio η* (at 60° C., 1 Hz and 10% amplitude) to η* (at 130° C., 1 Hz and 10% amplitude), means that a transition from non-Newtonian to approximately Newtonian behaviour takes place on increasing the temperature.

The value of less than 1.5, preferably less than 1.4, for the amplitude-dependent change of the complex viscosity (iv) (reduction of the viscosity), measured in the RPA at 130° C. as the ratio η* (at 1 Hz and 10% amplitude) to η* (at 1 Hz and 100% amplitude), means that there is an approximately Newtonian behaviour at the processing temperature.

One or more typical elastomers may be used as elastomers (1).

Of decisive importance is that at least one of the elastomers used contains carboxyl and/or carboxylate groups bonded to the polymer chains.

Usually, the elastomer (1) or the mixture of the elastomers (1), if a plurality of elastomers (1) is used, contains 0.5-15% by weight, based on 100% by weight of the elastomer (1) or based on the total mixture of the elastomer (1), if a plurality of elastomers (1) is used, of bonded carboxyl and/or carboxylate groups.

The elastomer (1) or the mixture of the elastomer (1), if a plurality of elastomers (1) is used, preferably contains 0.5-10% by weight, particularly preferably 1-7% by weight and in particular 1.5-6% by weight, based on 100% by weight of the elastomer (1) or based on the total mixture of the elastomer (1), if a plurality of elastomers (1) is used, of bonded carboxyl and/or carboxylate groups.

These carboxyl or carboxylate groups may be distributed randomly along the polymer chains of the elastomers and may also be present at the chain ends.

Suitable elastomers (1) containing carboxyl and/or carboxylate groups are, for example, the following:
1. Carboxylated nitrile rubber (also abbreviated to XNBR),
2. Hydrogenated, carboxylated nitrile rubber (also abbreviated to HXNBR),
3. Maleic anhydride ("MAH")-grafted rubbers based on EPM, EPDM, HNBR, EVA, EVM, SBR, NR or BR.
4. Carboxylated styrene-butadiene rubber (also abbreviated to XSBR),
5. AEM having free carboxyl groups,
6. ACM having free carboxyl groups and any desired mixtures of the abovementioned polymers.

The Mooney viscosity (ML 1+4, measured at 100° C.) of the elastomer (1) used or, if a plurality of elastomers (1) is used, of the total mixture of all elastomers (1) is in the range of 1-35, preferably in the range of 2 to 25, particularly preferably in the range of 5 to 20. The Mooney viscosity is determined according to ASTM standard D 1646.

Some of said elastomers are commercially available but furthermore are obtainable in all cases by preparation processes accessible to the person skilled in the art via the literature.

Under the carboxylated nitrile rubber (also designated as XNBR) is understood as meaning rubbers which are terpolymers or at least one unsaturated nitrile, at least one conjugated diene and at least one further termonomer containing carboxyl and/or carboxylate groups.

The $\alpha,\beta$-unsaturated nitrile used may be any known $\alpha,\beta$-unsaturated nitrile, and $(C_3-C_5)$-$\alpha,\beta$-unsaturated nitriles, such as acrylonitrile, methacrylonitrile, ethacrylonitrile or mixtures thereof, are preferred. Acrylonitrile is particularly preferred.

The conjugated diene may be of any type. $(C_4-C_6)$ conjugated dienes are preferably used. 1,3-Butadiene, isoprene, 2,3-dimethylbutadiene, piperylene or mixtures thereof are particularly preferred. In particular, 1,3-butadiene and isoprene or mixtures thereof are preferred 1,3-Butadiene is very particularly preferred.

Monomers containing carboxyl and/or carboxylate groups which may be used are, for example, $\alpha,\beta$-unsaturated carboxylic acids or esters thereof. Fumaric acid, maleic acid, acrylic acid and methacrylic acid as acids and esters thereof are preferred. Suitable esters are, for example, the methyl, ethyl, propyl, isopropyl, n-butyl, isobutyl, n-hexyl and 2-ethylhexyl monoesters of fumaric acid and/or maleic acid and/or the methyl, ethyl, propyl, isopropyl, n-butyl, isobutyl, n-hexyl and 2-ethylhexyl esters of acrylic acid and/or methacrylic acid. Other monomers containing carboxyl and/or carboxylate groups which may be used are unsaturated dicarboxylic acids or derivatives thereof, such as esters, amides or anhydrides, such as, for example, maleic anhydride.

The carboxylated nitrile rubbers may be polymers which have either one or more monomers containing carboxyl groups or one or more monomers containing carboxylate groups. However, there may also be polymers which simultaneously have one or more monomers containing carboxyl groups and one or more monomers containing carboxylate groups.

For example polymers of butadiene and acrylonitrile and acrylic acid and/or methacrylic acid and/or fumaric acid and/or maleic acid and/or the methyl, ethyl, propyl, isopropyl, n-butyl, isobutyl, n-hexyl and 2-ethylhexyl monoesters of fumaric acid and/or maleic acid and/or the methyl, ethyl, propyl, isopropyl, n-butyl, isobutyl, n-hexyl and 2-ethylhexyl esters of acrylic acid and/or methacrylic acid are suitable.

For example, polymers of butadiene and acrylonitrile and a monomer containing carboxyl groups, in particular fumaric acid, maleic acid, acrylic acid or methacrylic acid, are preferred. monomer containing carboxylate groups, in particular the methyl, ethyl, propyl, isopropyl, n-butyl, isobutyl, n-hexyl and 2-ethylhexyl monoesters of fumaric acid or maleic acid or the methyl, ethyl, propyl, isopropyl, n-butyl, isobutyl, n-hexyl and 2-ethylhexyl esters of acrylic acid methacrylic acid, are also preferred.

The proportions of conjugated diene and $\alpha,\beta$-unsaturated nitrile in the XNBR polymers may vary within wide ranges. The proportion of the conjugated diene or of the sum of the conjugated dienes is usually in the range of 40 to 90% by weight and preferably in the range of 55 to 75% by weight, based on the total polymer. The proportion of the $\alpha,\beta$-unsaturated nitrile or of the sum of the $\alpha,\beta$-unsaturated nitriles is usually 9.9 to 60% by weight, preferably 15 to 50% by weight, based on the total polymer. The additional monomers are present in amounts of 0.1 to 40% by weight, preferably 1 to 30% by weight, based on the total polymer. The proportions of all monomers sum in each case to 100% by weight.

The preparation of XNBR by polymerization of the abovementioned monomers is sufficiently well known to the person skilled in the art and extensively described in the literature (e.g. EP-A-0 933 381 and U.S. Pat. No. 5,157,083; Nippon Zeon).

In order to obtain particularly low-viscosity types of XNBR, it has proved useful to subject a starting XNBR to a molecular weight reduction by a metathesis reaction known from the literature.

Hydrogenated carboxylated nitrile rubbers (also abbreviated to HXNBR) are obtainable by various routes:

It is possible, for example, to graft an HNBR with compounds containing carboxyl groups. They can furthermore be obtained by hydrogenation of the carboxylated nitrile rubbers XNBR described above. Such hydrogenated carboxylated nitrile rubbers are described, for example, in WO-A-01/77185.

In the context of this application, "hydrogenation" or "hydrogenate" is understood as meaning at least 50%, preferably 75%, particularly preferably 85%, conversion of the double bonds originally present in the carboxylated nitrile rubber.

The hydrogenated carboxylated nitrile rubbers HXNBR are therefore a carboxylated nitrile rubber XNBR based on at least one unsaturated nitrile, at least one conjugated diene and at least one further termonomer containing carboxyl and/or carboxylate groups, at least 50% of the double bonds originally present in the XNBR being saturated.

Suitable HXNBR are, for example, hydrogenated carboxylated nitrile rubbers based on an XNBR obtained from butadiene and acrylonitrile and acrylic acid and/or methacrylic acid and/or fumaric acid and/or maleic acid and/or the methyl, ethyl, propyl, isopropyl, n-butyl, isobutyl, n-hexyl and/or 2-ethylhexyl monoesters of fumaric acid and/or maleic acid and/or the methyl, ethyl, propyl, isopropyl, n-butyl, isobutyl, n-hexyl and 2-ethylhexyl esters of acrylic acid and/or methacrylic acid.

Suitable HXNBR are furthermore, for example, hydrogenated carboxylated nitrile rubbers based on an XNBR obtained from butadiene and acrylonitrile and a monomer containing carboxyl groups, in particular fumaric acid, maleic acid, acrylic acid or methacrylic acid.

Suitable HXNBR are furthermore, for example, hydrogenated carboxylated nitrile rubbers based on an XNBR obtained from butadiene and acrylonitrile and a monomer containing carboxyl groups, in particular fumaric acid, maleic acid, acrylic acid or methacrylic acid, and a monomer containing carboxylate groups, in particular the methyl, ethyl, propyl, isopropyl, n-butyl, isobutyl, n-hexyl or 2-ethylhexyl monoesters of fumaric acid and maleic acid or the methyl, ethyl, propyl, isopropyl, n-butyl, isobutyl, n-hexyl or 2-ethylhexyl esters of acrylic acid or methacrylic acid.

It is possible in principle to carry out the hydrogenation of XNBR using homogeneous or hetergeneous hydrogenation catalysts.

As described in WO-A-01/77185, it is possible, for example, to carry out the reaction with hydrogen using homogeneous catalysts, such as, for example, the catalyst known as a "Wilkinson" catalyst (($PPh_3$)$_3$RhCl), or others. Processes for the hydrogenation of nitrile rubber are known. Rhodium or titanium are usually used as catalysts, but it also being possible to use platinum, iridium, palladium, rhenium, ruthenium, osmium, cobalt or copper, either as a metal or, preferably, in the form of metal compounds (cf., for example U.S. Pat. No. 3,700,637, German patent 2 539 132, EP-A-134 023, DE-A-35 41 689, DE-A-35 40 918, EP-A-298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also disclosed in DE-A-25 39 132 and EP-A-0 471 250.

The selective hydrogenation can be achieved, for example, in the presence of a rhodium-containing catalyst. For example, a catalyst of the general formula

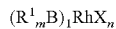

$(R^1_m B)_l RhX_n$ in which $R^1$ are identical or different and represent a $C_1$-$C_8$-alkyl group, a $C_4$-$C_8$ cycloalkyl group, a $C_6$-$C_{15}$ aryl group or a $C_7$-$C_{15}$ aralkyl group, can be used. B is phosphorus, arsenic, sulphur or a sulphoxide group S—O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethylsulphoxide)rhodium(III) chloride and tetrakis(triphenylphosphine)rhodium hydride of the formula ($C_6H_5$)$_3$P)$_4$RhH and the corresponding compounds in which the triphenylphosphine was completely or partly replaced by tricyclohexylphosphine. The catalyst can be used in small amounts. An amount in the range of 0.01-1% by weight, preferably in the range of 0.03-0.5% by weight and particularly preferably in the range of 0.1-0.3% by weight, based on the weight of the polymer, is suitable.

It is usually expedient to use the catalyst together with a cocatalyst which is a ligand of the formula $R^1_m B$, $R^1$, m and B having the abovementioned meanings. Preferably, m is 3, B is phosphorus and the radicals $R^1$ may be identical or different. These are preferably cocatalysts comprising trialkyl, tricycloalkyl, triaryl, triaralkyl, diaryl-monoalkyl, diaryl-monocycloalkyl, dialkyl-monoaryl, dialkyl-monocycloalkyl or dicycloalkyl-monoaryl radicals.

Examples of cocatalysts are to be found, for example in U.S. Pat. No. 4,631,315. A preferred cocatalyst is triphenylphosphine. The cocatalyst is preferably used in amounts in a range of 0.3-5% by weight, and more preferably in the range of 0.5-4% by weight, based on the weight of the nitrile rubber to be hydrogenated. Furthermore, the weight ratio of the rhodium-containing catalyst to the cocatalyst is preferably in the range of 1:3 to 1:55, and more preferably in the range of 1:5 to 1:45. Based on a 100 parts by weight of the nitrile rubber to by hydrogenated suitably 0.1 to 33 parts by weight of the cocatalyst, preferably 0.5 to 20 and very particularly preferably 1 to 5 parts by weight, in particular more than 2 but less than 5 parts by weight, of cocatalyst, based on 100 parts by weight of the nitrile rubber to be hydrogenated, are used.

The practical procedure for this hydrogenation is sufficiently well known to the person skilled in the art from U.S. Pat. No. 6,683,136. It is usually effected by treating the nitrile rubber to be hydrogenated, in a solvent, such as toluene or monochlorobenzene, at 100-150° C. and a pressure of 50-150 bar for 2-10 h with hydrogen.

The use of heterogeneous catalysts for the preparation of hydrogenated carboxylated nitrile rubbers by hydrogenation of the corresponding carboxylated nitrile rubbers usually involves supported catalysts based on palladium.

In addition to one or more elastomers (1) which have carboxyl and/or carboxylate groups, further elastomers (1) which have no carboxyl or carboxylate groups may also be present, provided that the mixture of all elastomers (1) in the composition according to the invention fulfils the important feature of the Mooney viscosity (ML 1+4 at 100° C.) in the range of 1-35.

For example NBR and HNBR can be used as elastomers (1) which have no carboxyl or carboxylate groups.

NBR are understood as meaning rubbers which are copolymers of at least one α,β-unsaturated nitrile and at least one conjugated diene.

An α,β-unsaturated nitrile which may be used is any known α,β-unsaturated nitrile, and ($C_3$-$C_5$)-α,β-unsaturated nitriles, such as acrylonitrile, methacrylonitrile, ethacrylonitrile or mixtures thereof, are preferred. Acrylonitrile is particularly preferred.

The conjugated diene may be of any type. ($C_4$-$C_6$) conjugated dienes are preferably used. 1,3-Butadiene, isoprene, 2,3-dimethylbutadiene, piperylene or mixtures thereof are particularly preferred. In particular, 1,3-butadiene and isoprene or mixtures thereof are preferred. 1,3-Butadiene is very particularly preferred.

The hydrogenated nitrile rubbers, HNBR, can be obtained from the NBR types in an analogous manner, as was described above for the preparation of HXNBR from XNBR.

Component (2)

Component (2) comprises one or more salts of the general formula (I)

$$(R^{y-})_{x/y} M^{x+} \quad \quad (I)$$

in which $R^{y-}$ represents an α,β-unsaturated $C_3$-$C_{14}$-carboxylate which contains y carboxylate groups, y may represent the values 1, 2, 3 or 4, x is 2, 3 or 4 and M is a divalent, trivalent or tetravalent metal.

M is the general formula (I) preferably represents Mg, Ca, Zn, Fe, Al, Ti, Pb, B, Sc, Yt, Sn or Hf, particularly preferably Mg, Ca, Zn, Fe, Al, Ti or Pb.

The radical $R^{y-}$ in the general formula (I) is preferably an α,β-unsaturated $C_3$-$C_8$-carboxylate which contains y carboxylate groups, it being possible for y to assume the value 1, 2, 3 or 4. Particularly preferably, $R^{y-}$ represents acrylate, methacrylate, crotonate, isocrotonate, sorbinate, fumarate or maleate or mixtures thereof.

Component (3)

As component (3), one of more free radical donors are used as crosslinking agents. Peroxide compounds, azides, photoinitiators, redox initiators or combinations of the abovementioned may be used as free radical donors.

Suitable free radical donors (3) are, for example, the following peroxide compounds: Bis(2,4-dichlorobenzoyl)peroxide, dibenzoyl peroxide, bis(4-chlorobenzoyl)peroxide, 1,1-bis(t-butylperoxy)-3,3,5-trimethylcyclohexane, tert-butyl perbenzoate, 2,2-bis(tert-butylperoxy)butene, 4,4-di-tert-butylperoxynonyl valerate, dicumyl peroxide, 2,5-dimethyl-2,5-di(tert-butylperoxy)hexane, tert-butyl cumyl peroxide, 1,3-bis(tert-butylperoxyisopropyl)benzene, di-tert-butyl peroxide, 2,5-dimethyl-2,5-di(tert-butylperoxy)hexyne, tert-butyl hydroperoxide, hydrogen peroxide, methyl ethyl ketone peroxide, lauroyl peroxide, decanoyl peroxide, 3,5,5-trimethylhexanoyl peroxide, di(2-ethylhexyl) peroxydicarbonate, poly(tert-butyl peroxycarbonate), ethyl 3,3-di(tert-butylperoxy)butyrate, ethyl 3,3-di(tert-amylperoxy)butyrate, n-butyl 4,4-di(tert-butylperoxy)valerate, 2,2-di(tert-butylperoxy)butane, 1,1-di(tert-butylperoxy)cyclohexane, 3,3,5-trimethylcyclohexane, 1,1-di(tert-amylperoxy)cyclohexane, tert-butyl peroxybenzoate, tert-butyl peroxyacetate, tert-butyl peroxy-3,5,5-trimethylhexanoate, tert-butyl peroxyisobutyrate, tert-butyl peroxy-2-ethylhexanoate, tert-butyl peroxypivalate, tert-amyl peroxypivalate, tert-butyl peroxyneodecanoate, cumyl peroxyneodecanoate, 3-hydroxy-1,1-dimethylbutyl peroxyneodecanoate, tert-butyl peroxybenzoate, tert-butyl peroxyacetate, tert-amyl peroxy-3,5,5-trimethylhexanoate, tert-butyl peroxyisobutyrate, tert-butyl peroxy-2-ethylhexanoate, cumyl peroxyneodecanoate, 3-hydroxy-1,1-dimethylbutyl peroxyneodecanoate, 2,5-dimethyl-2,5-di(tert-butylperoxy)hexyne (3-di-tert-amyl)peroxide, 2,5-dimethyl-2, 5-di(tert-butylperoxy)hexane, tert-amyl hydroperoxide, cumol hydroperoxide, 2,5-dimethyl-2,5-di(hydroperoxy) hexane, diisopropylbenzene monohydroperoxide and potassium peroxodisulphate.

A suitable free radical donor (3) is, for example, 2,2-azobismethylethylacetonitrile as an azide: further suitable azides are, for example, further commercially available azo initiators and free radical initiators, which can be obtained under the keywords "Vazo® free radical initiators" from DuPont and as "free radical azo initiators" from Wako Specialty Chemicals.

The following photoinitiators may also be mentioned by way of example as suitable free radical donors (3):

Benzoin, benzoin methyl ether, benzoin ethyl ether, benzoin isopropyl ether, benzoin n-butyl ether, benzoin isobutyl ether, benzoylphenylcarbinol, methylphenyl glyoxylate, 4,4'-diazidobiphenyl, 4,4'-diazidobenzophenone, 4,4'-diazidobiphenyl oxide, 4,4'-diazido-disulphonylbiphenyl, azidobenzene, 4-azidobenzoic acid, 1,2-bis(4-azidophenyl)ethylene, 4-aminophenyl-4'-azidophenylmethane, 2,6-di(4'-azidobenzal)cyclohexanone, sodium 4,4'-diazidostilbene-2,2'-disulphonate, benzophenone oxime, acetophenone, bromoacetophenone, cyclohexanone, diphenyl monosulphide, dibenzothiazolyl disulphide, s-acyl dithiocarbamate, m,m'-azoxystyrene, benzyl dimethyl ketal, 4-methylbenzophenone, 4-phenylbenzophenone, ethyl 4-dimethylaminobenzoate (EPD), 2-hydroxy-2-methylphenylpropan-1-one, isopropylthioxanthone (ITX) and 2-methyl-1-(4-methylthiophenyl)-2-morpholinopropan-1-one.

The following redox initiators may also be mentioned by way of example as suitable free radical donors (3):

Fe(II)/hydroperoxide, peroxide/tertiary amine, peroxodisulphate/thiosulphate, hydroperoxide/thiosulphate.

Component (4)

The crosslinkable composition according to the invention may furthermore contain further constituents as component (4):

fillers customary in the rubber industry, such as carbon blacks, silica, talc, chalk or titanium dioxide, kaolins, bentonites, carbon nanotubes, aluminium hydroxide, magnesium hydroxide or Teflon (the latter preferably in powder form), polymers which are not covered by the definition according to the invention of elastomer (1), oils, plasticizers, processing auxiliaries, stabilizers and antioxidants, dyes, fibres comprising organic and inorganic fibres and fibre pulps, vulcanization activators, additional polymerizable monomers, dimers, trimers or oligomers The user of an antioxidant in the compositions according to the invention may be desired. Examples of customary antioxidants include p-dicumyldiphenylamine (Naugard® 445), Vulkanox® DDA (styrenated diphenylamine), Vulkanox® ZMB2 (zinc salt of methylmercapto-benzimidazole), Vulkanox® HS (polymerized 1,2-dihydro-2,2,4-trimethylquinoline) and Irganox® 1035 (thiodiethylene bis(3,5-di-tert-butyl-4-hydroxy)hydrocinnamate or thiodiethylene bis(3-(3,5-di-tert-butyl-4-hydroxyphenyl)propionate).

The present invention furthermore relates to a process for the preparation of the crosslinkable compositions according to the invention by mixing all components (1)-(3) and optionally component(s) (4).

The sequence in which the components are mixed with one another is not of fundamental importance but is adapted in each case to the available mixing units.

The mixing of the components (1), (2), (3) and optionally (4) can, depending on temperature, be effected with the use of the typical mixing systems customary in the rubber industry. a) discontinuously mixing units in the form of mixing rolls or internal mixers and b) continuously mixing units, such as mixing extruders, can be used.

This is appropriate in the temperature range in non-Newtonian behaviour of the crosslinkable mixtures according to the invention but can also be effected at higher temperatures in the range of Newtonian behaviour of the mixtures. However, the use of units customary in the adhesives industry is also possible.

It has proved particularly useful to carry out the mixing of the components (1), (2) and (3) and optionally as (4) at predetermined mixer temperature in the range of about 30-40° C., since sufficiently high shear forces can be applied here by means of the abovementioned mixing units customary in the rubber-processing industry in order to achieve thorough mixing.

Alternatively, mixing can also be effected in suitable units at higher temperatures. In the individual case, it may be necessary first to mix the components (1) and (2) and optionally (4) and to admix the free radical donor (3) only right at the end. This can take place, for example, in the mixing unit in the end section of a nozzle immediately before the mixture emerges onto the substrate/into the mould. Such reactive mixing of analogously customary two-component systems based on PU or silicone rubbers has not been described to date for conventional high-performance rubbers since these were not present in the low-viscosity form required for this purpose. There is here therefore additionally a particular advantage of the compositions according to the invention over PU and silicone rubbers since the emerging moulding materials rapidly acquire high stability under load on cooling and therefore also do not hinder directly subsequent processing processes, such as, for example, by subsequent adhesion.

In practice, the crosslinkable compositions are obtained, for example in the form of so-called "milled sheets", endless strips or endless bodies, also as pellets or granules, after mixing with the components according to the invention. These can subsequently be pressed or injection moulded in moulds and are crosslinked under suitable conditions according to the free radical donors used.

The invention furthermore relates to the preparation of crosslinked elastomers, at least one of which has carboxyl and/or carboxylate groups, by subjecting the crosslinkable composition according to the invention, of the abovementioned type, to energy input.

The energy input can be effected in the form of thermal energy or radiation energy, depending on the type of crosslinking agent (3) chosen in the crosslinkable composition.

During the crosslinking of the crosslinkable composition according to the invention, the crosslinking agents (3) firstly lead to polymerization of the unsaturated acid in component (2) and furthermore effect free radical crosslinking between and with the elastomers (1) used.

The invention furthermore relates to the crosslinked elastomers, at least one of which has carboxyl and/or carboxylate groups, which are obtainable by crosslinking of the mixtures according to the invention.

The crosslinked elastomers have a strength, measured in the tensile test according to DIN 53504, of greater than 10 MPa and furthermore have a hardness, measured according to DIN 53505, of greater than 60 Shore A.

These elastomers irreversibly crosslinked by the free radical-donating crosslinking agents are distinguished in that, in spite of a low viscosity, they do surprisingly have excellent dynamic mechanical properties and strengths, as could be obtained to date only starting from high-viscosity mixtures based on high-performance rubbers, such as HNBR, EVM, ACM, AEM, after vulcanization. As a result of this combination of properties, completely novel component groups and applications forms and uses are conceivable. These are high-modulus vulcanizates based on low-viscosity mixtures according to the invention. Products having this property profile in processing and vulcanizate properties are not known on the market and have not been technically described.

The crosslinkable compositions according to the invention can be used for the production of a multiplicity of different products, some of which are listed below:

1. Elastic Adhesive Materials

The invention relates to the use of crosslinkable compositions as elastic adhesive materials.

The invention therefore also relates to a process for using the inventive crosslinkable composition to prepare adhesion layers on cold components comprising applying the crosslinking composition on a cold component.

Elastic adhesive materials are usually based on composite systems comprising epoxides, diols, isocyanates, and carboxylic acids. Elastification typically takes place by means of low molecular weight amorphous diols or by the use of low molecular weight elastomeric additives. The customary systems have high strengths up to about 100° C. Depending on the melting point of the constituents, the strengths decrease substantially at higher temperatures. All these adhesives are sensitive to hydrolysis and only moderately oil-resistant and therefore limited in their field of use.

The crosslinkable compositions according to the invention are suitable in particular for the preparation of high-strength adhesive materials having outstanding elastic properties, which are applied in liquid form but are then present in dimensionally stable form on the cold component. After pressing and crosslinking with energy input, an outstanding adhesion layer between metals and metal, between metal and polar high-temperature thermoplastics, between metal and fabrics/cord, between fabric/cord and thermoplastics, between fabric/cord and rubber, between fabric/cord and fabric/cord is permitted starting from these elastic adhesive materials. Adhesive materials based on crosslinkable compositions according to the invention are moreover distinguished by excellent oil resistances and thermal stabilities.

2. Impregnating Materials

The invention furthermore relates to the use of the crosslinkable compositions according to the invention as impregnating materials.

The invention therefore relates to a process for using the inventive crosslinkable composition as impregnating material comprising applying the crosslinkable composition to a substrate and then vulcanizing the crosslinkable composition by energy input.

The application of the crosslinkable composition according to the invention to the substrate can be effected, for example in the case of fabric impregnation, a) by direct application (impregnation) with the crosslinkable composition according to the invention or b) coverage by frictioning of fabric in the crosslinkable composition according to the invention.

By carrying out this process, expensive latex coating systems of difficult quality and complicated and environmentally problematic solution processes can be replaced or solutions of very high concentration can be prepared, so that in turn solvent quantities can be saved and production capacities which are frequently limited by the capacity for solvent recycling can be expanded. Compared with latex application, the substantial advantage of the crosslinkable composition according to the invention is that preheating of materials, as required for activating the latex, is dispensed with. Fields of use for such impregnated fabric are, for example, belts of all types, membranes, bellows, pneumatic springs, rubber muscles and also hoses.

3. Belts, for Example in the Form of Toothed Belts or Drive Belts

The invention relates to the use of the crosslinkable compositions according to the invention for the production of belts, preferably toothed belts or drive belts.

The invention therefore relates to a process for using the inventive crosslinkable composition to prepare belts by applying the crosslinkable composition together with other rubber components and/or flexible fabrics and/or cords to a drum having the negative form of the belt and subjecting the so covered drum to a vulcanization.

The typical production, known to the person skilled in the art, of belts, for example in the form of toothed belts, takes place according to the following process; a drum having negative teeth is covered with a still flexible fabric (typically based on polyamide yarns). A cord (typically based on steel, brass, polyaramid, glass or carbon fibres) is wound tightly (cord filament spacings about 0.05 to 1 mm) on this drum. Layers/milled sheets of rubber mixtures are placed on this wound cord. Depending on the requirements, a further fabric can be stretched over the rubber mixtures. The finally covered drum is transferred to a vulcanization autoclave with semielastic membranes. The rubber layers are pressed through the cord layer into the tooth cavities, the fabric forming the outer border of the tooth. The thickness of the rubber layers is such that the tooth cavities are filled and a desired layer thickness above the cord layer is obtained. After the pressing, the vulcanization/crosslinking process begins. After the crosslinking, the belt is ready and can be cut into the desired width, since the drum for belt production is typically 0.5-2.5 m wide while a belt typically has a width of 1-30 cm. The back of the belt (the part of the belt which is above the cord layer) can subsequently also be ground or further treated. The commercially available belts according to the process described are typically produced on the basis of a single mixture. A disadvantage of this is that tooth and back have to meet different requirements. Thus, the tooth frequently has to have a very high modulus and high strengths (the applies, for example, toothed belts which are used as drive belts for engine control in customary automobile models), while the back rather has to be flexible in order to avoid breaking, for example, during revolution around small deflecting rollers. These partially contrary requirements limit the choice of suitable mixtures. It is possible in principle to choose the mixture composition of the milled sheet layers before the vulcanization so that the lower layer produces a high-modulus vulcanizate and the back layer a low-modulus vulcanizate. The difficulty is that these layers must not be mixed during pressing. In fact, high-modulus vulcanizates are typically based on relatively high-viscosity mixtures (for example, have a high filler content of reinforcing fillers, otherwise the required dynamic properties and the modulus of the product are not reached), while low-modulus vulcanizates are based on comparatively low-viscosity mixtures (having a low filler content of reinforcing fillers). During the pressing of such milled sheets stacked one on top of the other through the cord layer into teeth, mixing, which is critical for the functioning of the belt thus obtained, inevitably occurs. For this reason, such belts comprising at least two mixtures of greatly different viscosity according to a one-stage production process are not on the market.

Furthermore known to the person skilled in the art is a two-stage process which permits the above-described product advantages of a belt, which allows mixtures differing in the properties for the tooth as well as the back, wherein the toothed bottoms being partly constructed manually with mixture strips/extrudates and the milled sheet for the back being applied only thereafter in a separate second step and then being further processed as described above. This process has the major disadvantage that a two-stage process is necessary and special components are required for this process. Overall, this process is substantially more uneconomical in the process first described.

The use, according to the invention, of the special crosslinkable compositions now makes it possible to combine the more economical one-stage process described with the advantages of the more complicated two-stage process. This is achieved by the possibility of providing extremely low-viscosity mixtures according to the invention which give dynamically stable, high-modulus vulcanizates after crosslinking. The back mixture may be based on a classical mixture composition, the viscosity being substantially above the crosslinkable composition according to the invention for the teeth. The large differences in the mixture viscosity of the two layers (at high temperatures/high shearing) and makes it possible for high-viscosity layer provided for the back to push the layer provided for tooth filling in front of it without major back mixing into the tooth cavities.

Particularly advantageous in this use of the crosslinkable composition according to the invention is that the low-viscosity composition according to the invention still has sufficient strength (green strength) at room temperature that the toothed belt can be built up according to a customary process using the customary apparatuses, because stable milled sheets which are necessary for manufacturing the belt can still be produced from the composition according to the invention at room temperature.

4. Roll Covers

The invention furthermore relates to the use of the compositions according to the invention for the production of roll covers.

The invention therefore relates to a process for using the inventive crosslinkable composition to prepare roll covers comprising applying the crosslinkable composition to a roll body and then vulcanizing this crosslinkable composition on the roll-body.

High-modulus roll covers, as used, for example, in the transport, paper or steel industry, are usually produced, as known to the person skilled in the art, on the basis of rubber vulcanizates. In order to achieve the required properties of extreme hardness and moduli, very high viscosity mixtures are typically required. These mixtures are placed in layers on the roll body as milled sheets or directly extruded. The viscosity and hence the degree of filling which is to be produced by the high moduli and hardnesses are subject to limits. Very high-viscosity milled sheets comprising the mixture frequently can no longer run together during the vulcanization, and preformed cracks and stresses in the products therefore form and lead to premature failure. Another process known to the person skilled in the art for producing high-modulus roll covers starts from polyurethane mixtures which are applied in liquid form and, after in situ curing (by reactive crosslinking, crystallization, conversion into a thermoplastic polyurethane (TPU)), have extreme hardness and very good dynamic stability. However, these products have the difficulty that the dynamic mechanical properties very greatly decrease at temperatures >100° C. and furthermore there is only poor stability, inter alia because of hydrolysis, to a very wide range of media. The cause of this is the thermoplasticity (TPUs belonging to the material class consisting of the TPEs; after softening of the crystalline fractions, the properties are substantially lost) and chemical instability to acids and bases, as well as esters, aromatic oils and fats.

By using the crosslinkable composition according to the invention for the production of such roll covers, on the other hand, it is possible to apply the compositions according to the invention to the roll body at temperatures >100° C. and/or with high shearing. The very low-viscosity, in some cases "liquid" starting material, i.e. the crosslinkable composition according to the invention, which nevertheless has sufficient stability under load, is applied to the roll in order to be vulcanized and, after vulcanization, leads to products having outstanding physical properties, high modulus and strength. In a non-"liquid" a still processible application form, it is possible here to achieve degrees of filling which are substantially higher than conventional systems without the processability being endangered and the stress cracks mentioned occurring in the roll covers.

5. Thermoplastic Vulcanizates

The invention furthermore relates to the use of the crosslinkable composition for the preparation of thermoplastic vulcanizates.

In addition to the elastomer-based crosslinkable composition, one or more thermoplastic polymers are furthermore used here.

The invention therefore relates to a process for using the inventive crosslinkable composition to prepare thermoplastic vulcanizates by subjecting the crosslinkable composition and one or more thermoplastic polymers to a vulcanization.

In the preparation of thermoplastic vulcanizates by means of dynamic crosslinking, the kinetic process of phase inversion, in which initially thermoplastic particles are present dispersed in the elastomer matrix, to give phase structure where the elastomer particles are present in vulcanized form and dispersed in a thermoplastic matrix, is of decisive importance. To ensure that as homogeneous a particle structure as possible having as small a particle size as possible is achieved (as a basic precondition for good dynamic mechanical properties of the products) the viscosity of the thermoplastic melt and the viscosity of the rubber phase must of as comparable an order of magnitude as possible. If the viscosity differences are too large, only particle sizes of the rubber phase of >1-50 μm are reached, which leads to only poor properties of the desired product. In order to adapt these viscosities, large amounts of plasticizers are frequently used, which of course lead to a deterioration in the properties of the elastomeric phase. For oil-stable vulcanizates, the use of large amounts of plasticizers (partly compatible oils which are used for reducing the viscosity of a mixture) are not desired owing to the frequently poor compatibility of plasticizers and elastomer, because, in the case of excessively large doses of plasticizers, these can exude from the component, which leads to a reduction in the optical quality of the components.

By using the crosslinkable compositions according to the invention, it is now possible to provide highly polar, oil-stable elastomer phases of very low viscosity, nevertheless having outstanding physical properties, which overcome the disadvantages described, i.e. excellent processing properties and phase distribution are achieved while at the same time retaining the optical and mechanical properties.

Polyamides which may be used in the composition according to the invention are homo- or copolymers which contain, in the polymer main chain, monomer building blocks which are linked via amide bonds (—C(=O)—NH—). Examples of polyamides which may be used are polycaprolactam (nylon 6), polylaurolactam (nylon 12), polyhexamethylene adipate (nylon 6,6), polyhexamethyleneazelaamide (nylon 6,9), polyhexamethylenesebacamide (nylon 6,10), polyhexamethyleneisophthalamide (nylon 6, IP), polyaminoundecanoic acid (nylon 11), polytetramethyleneadipamide (nylon 4,6) and copolymers of caprolactam, hexamethylenediamine and adipic acid (nylon 6,66) and aramids, such as polyparaphenyleneterephthalamide. The majority of the polyamides have softening points and melting points in the range of 120 to 260° C. The polyamides preferably have a high molecular weight and are crystalline.

Polyesters which may be used in the composition according to the invention are homo- or copolymers which have, in the polymer main chain, monomer building blocks which are linked via ester groups (—C(=O)—O—). For example, the hydroxycarboxylic acid types or dihydroxydicarboxylic acid types can be used as homopolyesters. The former can be prepared by polycondensation of an ω-hydroxycarboxylic acid or by ring-opening polymerization of cyclic esters (lactones), and the latter by polycondensation with two complementary monomers, for example a diol and a saturated or unsaturated dicarboxylic acid.

Poly(ethylene terephthalate), poly(oxy-1,2-ethanediyloxycarbonyl-1,4-phenylenecarbonyl), poly(1,4-dimethylenecyclohexane terephthalate), poly(butylene terephthalate), poly(tetramethylene terephthalate), poly(oxy-1,4-butanediyloxycarbonyl-1,4-phenylene carbonyl) may be used, (cf. also *Ullmann's Encyclopedia of Industrial Chemistry* Copyright © 2002 DOI: 10.1002/14356007.a21_227 Article Online Posting Date: Jun. 15, 2000).

Polyimides which may be used in the composition according to the invention are homo- or copolymers which contain, in the polymer main chain, monomer building blocks which are linked via imide groups. The imide groups may be present as linear or cyclic units. The melting points of the suitable polyimides are in the range 150-260° C. (cf. also *Ullmann's Encyclopedia of Industrial Chemistry* Copyright ©2002 by Wiley-VCH Verlag GmbH & Co. KGaA.DOI: 10.1002/14356007.a21_253).

Polypropylenes which may be used in the composition according to the invention are all polypropylenes having a melting point of >150° C. and a high degree of crystallinity.

Polyethers which may be used in the composition according to the invention are homo- or copolymers which contain, in the polymer main chain, monomer building blocks which are linked via ether groups (C—O—C) and are distinguished by a melting point greater than about 150° C. and less than about 260° C.

6. Shaped Articles

The invention furthermore relates to the use of the crosslinkable composition according to the invention for the production of shaped articles.

The invention therefore also relates to a process for using the inventive crosslinkable composition to prepare shaped articles comprising subjecting the crosslinkable composition to an injection moulding or compression moulding.

Shaped articles are typically produced in the injection moulding or compression moulding. The finer the desired structures, the higher are the requirements which the flow properties of the materials used have to meet. Here, fine structures combined with high strengths and high modulus are a challenge known to the person skilled in the art. Flow properties can frequently be improved by means of process auxiliaries. The process auxiliary comes into contact with the surfaces of the mixtures during processing processes and wets the contact surfaces with the moulds. In this way, adhesion to the wall is reduced and the flow behaviour improved. This advantage is however frequently also accompanied by increased soiling of the surfaces of the parts, and the latter therefore have to be subjected to additional cleaning processes and hence the times of use of the mould decrease and down times of the mould are increased.

The composition according to the invention offers a solution to this problem because here high flowability is combined with excellent properties after vulcanization.

The following may be mentioned by way of example here as process for the production of shaped articles:

A In-place Gasketing

So-called "in-place gasketing" is a process in which usually very low-viscosity, in some cases liquid, starting materials, generally based on polyurethane or silicone rubbers, are processed in liquid form, poured into moulds and then reactively crosslinked. Both systems show only poor physical properties and low stability to swelling in polar media at high temperatures of use of more than 100° C. in comparison with other high-performance elastomers, such as HNBR, EVM, AEM and ACM, and it is for this reason that the potential uses are limited to the area of systems free of mechanical load with only little stability to oil.

With the composition according to the invention, complex systems can now be filled by means of in-place gasketing owing to the low viscosity at relatively high temperature and/or with high shearing and stability under load can be produced when cooling of the preliminary layers is present, which stability under load permits a downstream crosslinking process without critical loss of the dimension of the sealing parts. After vulcanization, these products show high thermal stability and stability to oil and excellent dynamic mechanical properties. They thus combine the advantages of liquid systems with those based on the mixture of high-viscosity high-performance elastomers.

B Plastic-rubber Coinjection Moulding

Plastic-rubber coinjection moulding is a process in which first a plastic/thermoplastic component is injection moulded in a thermoplastic mould. This is transported in a turntable mould within the same machine to a rubber injection unit, the rubber then being injected and being vulcanized on one side with contact with the thermoplastic mould and on the other side with contact with the metal mould. This process is advantageous because complex thermoplastic-rubber shaped articles can be injected and bonded in a single step. Critical for the production of complex components, e.g. shaped thermoplastic articles having complicated rubber vulcanizate sealing elements, is the flowability of the rubber mixture and the property profile of the vulcanized rubber as well as the adhesion between the two components. Extremely flowable rubber mixtures based on, for example, silicon rubber show good filling of the mould but very limited adhesion and vulcanization properties. Owing to their high viscosity, conventional rubber mixtures can often fill complex cavities only with difficulty. A further difficulty of conventional systems is the achievement of cycle times such as those possible in the case of reactive crosslinking systems of, for example, silicone or polyurethane rubber, since the crosslinking times with the use of suitable peroxides or with the use of amine crosslinking systems, such as, for example, in the case of AEM rubber, which are necessary for high-temperature applications, are relatively long. The matching of precure and full cure is always difficult here. As long a precure time as possible is necessary in order to permit filling of the mould particularly in the case of high-viscosity materials, and a short full cure time is necessary in order to keep the cycle times in the rubber-plastic coinjection moulding process short, since the vulcanization process of the rubber is the time-determining factor in this process.

In this process according to the invention, the use of the compositions according to the invention permits both excellent filling of the mould and excellent vulcanization properties, high adhesion and comparatively short cycle times.

In addition to the abovementioned broader possibilities of use, the crosslinkable compositions according to the invention can also be used for the following special applications, for example for the production of foamed shaped articles, shaped articles for sealing adhesive materials, flat packings (also referred to as soft material seals), joint packings (solid or foamed), friction and brake linings, clutch linings, as additive for the elastification of phenol-formaldehyde resin materials and epoxy resin materials, for impact modification of thermoplastics and thermosetting plastics, for the production of cylinder head gaskets, cylinder head cover gaskets, hoses, membranes, seals, bellows, rubber muscles, sheet metal coatings, adhesion systems which are solvent free or have a low solvent content, for adhesive bonding of fabrics without a separate adhesion layer, as fabric top layers, rubber-metal adhesion systems having a high modulus, for surface adhesion, for solvent-free flexibilization of circuit boards instead of ground rubber, as coated metal seals, repair mixtures for conveyor belts or belts, as adhesion mixtures for the bonding of endless belts and belts and for products produced by the screen printing process.

The inventive subject of the present invention arises not only from the subject matter of the individual patent claims but also from the combination of the individual patent claims with one another. The same applies to all parameters disclosed in the description and any desired combinations thereof.

EXAMPLES

The primary mixing unit used was a mixing roll having a roll unit cooled to 30° C., of type WNU3 from Troester, with rolls which have a diameter of 200 mm. The elastomer was initially introduced and all further components were added in the sequence (2), then (4), then (3) (see list of components shown below). The speed and friction of the roll was controlled so that stable milled sheets are obtained. After a mixing timer of about 5 min the mixing was terminated and the product was taken off as a milled sheet from the roll. Vulcanization of these milled sheets was then carried out at 180° C. for 15 min in platen presses.

Components used:

1. Therban® AT-XT VP KA 8889

Carboxylated hydrogenated nitrile rubber, ACN content: 33% by weight, Mooney viscosity ML 1+4 @ 100° C.: type a) 10 ME or type b) 25 ME, residual double bond content: 3.5%.

The elastomer used here was prepared by metathesis of Therban® XT VP KA 8889 (XNBR) from Lanxess Deutschland GmbH and subsequent hydrogenation.

2. Therban® XT VP KA 8889

Carboxylated hydrogenated nitrile rubber from Lanxess Deutschland GmbH ACN content: 33%, Mooney viscosity ML 1+4 @ 100° C.: 78 ME, residual double bond content: 3.5%.

This elastomer is commercially available from Lanxess Deutschland GmbH.

3. Sartomer® SR 633

Zinc diacrylate from Sartomer

4. Statex N330

Carbon black from Columbian Chemical Company

5. Carbon black IRB 7

Industry Reference carbon black 7

6. Zinc oxide IRM 91

Industry reference ZnO

7. Rhenofit® OCD

Octylatable diphenylamine (antiaging agent) from Rheinchemie

8. Rhenofit® TAC/S
   Triallyl cyanurate (vulcanization activator) from Rheinchemie
9. Perkadox® 14-40 B-GR
   Bis(tert-butyl peroxiisopropyl)benzene from Akzo Nobel Chemicals B.V.
10. Vulkanox® ZMB2/C5
    Zinc mercaptobenzimidazole stabilizer from Lanxess Deutschland GmbH All stated amounts "phr" in the tables denote parts per hundred parts of rubber. The elastomer component corresponds to 100 phr.

The determination of the complex viscosity $\eta^*$ and the change of the complex viscosity as a function of the temperature or amplitude was effected in a rubber process analyser (RPA 2000) from Alpha Technologies.

The vulcanization measurement was effected in a Monsanto Rheometer MDR 2000 at a test temperature of 180° C. over a test time of 15 min.

Examples 1-9

All comparative examples are characterized by a * behind the respective example number in the tables below.

TABLE 1

Crosslinkable compositions

| Component | \multicolumn{9}{c}{Example (phr)} | | | | | | | | |
|---|---|---|---|---|---|---|---|---|---|
| | 1* | 2* | 3* | 4 | 5 | 6* | 7* | 8* | 9* |
| Therban ® XT-AT VPKA 8889 (10 ME) | 100 | | | 100 | | | 100 | | |
| Therban ® XT-AT VPKA 8889 (25ME) | | 100 | | | 100 | | | 100 | |
| Therban ® XT VPKA 8889 (87 ME) | | | 100 | | | 100 | | | 100 |
| Statex N 330 | | | | | | | | | |
| Sartomer ® SR 633 | | | | 54 | 54 | 54 | | | |
| IRB 7 | | | | | | | 40 | 40 | 40 |
| IRM 91 | | | | | | | 3 | 3 | 3 |
| Rhenofit ® OCD | | | | | | | 2 | 2 | 2 |
| Vulkanox ® ZMB2/C5 | | | | | | | 0 | 0 | 0 |
| Rhenofit ® TAC/S | | | | | | | 2 | 2 | 2 |
| Perkadox ® 14-40 B-GR | 4 | 4 | 4 | 4 | 4 | 4 | 10 | 10 | 10 |

TABLE 2

Rheological properties of the vulcanizable compositions
(test method RPA)

| Test results for $\eta^*$ | 1* | 2* | 3* | 4 | 5 | 6* | 7* | 8* | 9* |
|---|---|---|---|---|---|---|---|---|---|
| Amplitude-dependent Temperature 60° C. Test frequency 1.00 Hz | | | | | | | | | |
| $\eta^*$ (10%) [Pa s] | 26983 | 39493 | 79791 | 60924 | 85004 | 137826 | 55658 | 87713 | 156138 |
| $\eta^*$ (30%) [Pa s] | 26436 | 38618 | 77513 | 52961 | 74481 | 123518 | 47195 | 74190 | 132076 |
| $\eta^*$ (100%) [Pa s] | 22261 | 31710 | 59181 | 34351 | 45744 | 65102 | 30142 | 44858 | 70592 |
| $\eta^*$ (10%) at 60° C./ $\eta^*$ (100%) at 60° C. | 1.21 | 1.25 | 1.35 | 1.77 | 1.86 | 2.12 | 1.85 | 1.96 | 2.21 |
| Temperature-dependent Temperature 130° C. Test frequency 1.00 Hz | | | | | | | | | |
| $\eta^*$ (10%) [Pa s] | 1666 | 4905 | 20527 | 4278 | 10069 | 43399 | 11726 | 19297 | 55324 |
| $\eta^*$ (30%) [Pa s] | 1733 | 4861 | 19954 | 3961 | 9249 | 38770 | 6742 | 13389 | 45397 |
| $\eta^*$ (100%) [Pa s] | 1647 | 4377 | 16871 | 3449 | 7560 | 27522 | 4577 | 9455 | 29857 |
| $\eta^*$ (10%)/$\eta^*$(100%) | 1.01 | 1.12 | 1.22 | 1.24 | 1.33 | 1.58 | 2.56 | 2.04 | 1.85 |
| $\eta^*$ (10) at 60° C./ $\eta^*$ (10) at 130° C. | 16.20 | 8.05 | 3.89 | 14.24 | 8.44 | 3.18 | 4.75 | 4.55 | 2.82 |

TABLE 3

Vulcanization measurement

| Test parameter | Example | | | | | | | | |
|---|---|---|---|---|---|---|---|---|---|
| | 1* | 2* | 3* | 4 | 5 | 6* | 7* | 8* | 9* |
| Minimum torque [dNm] | 0.02 | 0.08 | 0.63 | 0.02 | 0.10 | 1.14 | 0.20 | 0.47 | 1.37 |
| Maximum torque [dNm] | 0.5 | 1.1 | 4.4 | 68.5 | 60.9 | 75.1 | 8.8 | 12.2 | 19.6 |
| tan δ of end value | 0.51 | 0.38 | 0.15 | 0.17 | 0.16 | 0.13 | 0.18 | 0.14 | 0.08 |
| Time difference T90%-T10% min | 8.0 | 5.9 | 3.2 | 0.8 | 0.8 | 0.9 | 5.9 | 5.2 | 4.5 |

TABLE 4

Physical properties of the vulcanizates obtained by sheet pressing

| | Example | | | | | | | | |
|---|---|---|---|---|---|---|---|---|---|
| | 1* | 2* | 3* | 4 | 5 | 6* | 7* | 8* | 9* |
| Temperature | 180° C. | | | | | | | | |
| Time | 15 min | | | | | | | | |
| Test specimen: | Standard by S2 | | | | | | | | |
| Tensile test by | SR 2 RT | | | | | | | | |
| Test parameter | | | | | | | | | |
| F [MPa] | 1.3 | 2.2 | 8.7 | 15.9 | 18.3 | 44.8 | 16.6 | 22.8 | 32.5 |
| D [%] | 1058.0 | 875.0 | 745.0 | 152.0 | 130.0 | 245.0 | 276.0 | 272.0 | 238.0 |
| S50 [MPa] | 0.30 | 0.40 | 0.70 | 11.10 | 12.50 | 13.80 | 2.70 | 3.00 | 3.60 |
| S100 [MPa] | 0.30 | 0.40 | 0.80 | 14.00 | 16.50 | 20.20 | 5.50 | 6.60 | 9.60 |

Only compositions 4 and 5 according to the invention show "liquid" processability and high temperatures (130° C.) and normal rubber-like processability at low temperatures (60° C.), as described above. Only the compositions according to the invention show excellent physical properties, such as high modulus, great hardness and high strengths in combination with liquid processability below the crosslinking temperature of 180° C. Only the compositions according to the invention show very low tan δ values after crosslinking—as can be seen from the MDR measurement—despite extremely high crosslinking densities and extremely low processing viscosities.

What is claimed is:

1. A crosslinkable composition containing
   (1) one or more elastomers, at least one thereof having carboxyl and/or carboxylate groups
   (2) one or more different salts of the general formula (I)

$(R^{y-})_{x/y}M^{x+}$                            (I)

in which
   $R^{y-}$ represents an α,β-unsaturated $C_3$-$C_{14}$-carboxylate which contains y carboxylate groups,
   y may represent the values 1, 2, 3 or 4,
   x is 2, 3 or 4 and
   M is a divalent, trivalent or tetravalent metal and,
   (3) one or more crosslinking agents which act as free radical donors,
   wherein
   (a) the elastomer (1) or, if a plurality of elastomers (1) is used, the mixture of all elastomers (1) together has a Mooney viscosity (ML 1+4 at 100° C.), measured according to ASTM standard D 1646, in a range of 1-35 and
   (b) the crosslinkable composition
      (i) has a complex viscosity η*, measured in a Rubber Process Analyzer (RPA) at 60° C., 1 Hz and an amplitude of 10%, of greater than 30 000 Pas,
      (ii) an amplitude-dependent change of the complex viscosity, measured in the RPA at 60° C. as the ratio of η* (at 1 Hz and 10% amplitude) to η* (at 1 Hz and 100% amplitude), of greater than 1.4,
      (iii) a temperature-dependent change of the complex viscosity, measured in the RPA as the ratio of η* (at 60° C., 1 Hz and 10% amplitude) to η* (at 130° C., 1 Hz and 10% amplitude), of greater than 6 and
      (ii) an amplitude-dependent change of the complex viscosity, measured in the RPA at 130° C. as the ratio of η* (at 1 Hz and 10% amplitude) to η* (at 1 Hz and 100% amplitude), of less than 1.5,
   the values stated for the complex viscosity (η*) in all above-mentioned cases (i)-(iv) indicate in each case the mathematical magnitude of the complex viscosity.

2. The crosslinkable composition according to claim 1 containing
   (1) 10-94% by weight of one or more elastomers, at least one thereof having carboxyl and/or carboxylate groups,
   (2) 5-89% by weight of one or more salts of the general formula (I)

$(R^{y-})_{x/y}M^{x+}$                            (I)

in which
   $R^{y-}$ represents an α,β-unsaturated $C_3$-$C_{14}$-carboxylate which contains y carboxylate groups,
   y may represent the values 1, 2, 3 or 4,
   x is 2, 3 or 4 and
   M is a divalent, trivalent or tetravalent metal, and
   (3) 1-20% by weight of one or more crosslinking agents which act as free radical donors,
   the sum of the components (1), (2) and (3) being less than or equal to 100% by weight, wherein
(a) the elastomer (1) or, if a plurality of elastomers (1) is used, the mixture of all elastomers (1) together has a Mooney-viscosity (ML 1+4 at 100° C.), measured according to ASTM standard D 1646, in a range of 1-35 and
(b) the crosslinkable composition
(i) has a complex viscosity η*, measured in a Rubber Process Analyzer (RPA) at 60° C., 1 Hz and an amplitude of 10%, of greater than 30 000 Pas,
(ii) an amplitude-dependent change of the complex viscosity, measured in the RPA at 60° C. as the ratio of η* (at 1 Hz and 10% amplitude) to η* (at 1 Hz and 100% amplitude), of greater than 1.4,
(iii) a temperature-dependent change of the complex viscosity, measured in the RPA as the ratio of η* (at 60° C., 1 Hz and 10% amplitude) to η* (at 130° C., 1 Hz and 10% amplitude), of greater than 6, and
(iv) an amplitude-dependent change of the complex viscosity, measured in the RPA at 130° C. as the ratio of η* (at 1 Hz and 10% amplitude) to η* (at 1 Hz and 100% amplitude), of less than 1.5, the values stated for the complex viscosity (η*) in all abovementioned cases (i)-(iv) indicating in each case the mathematical magnitude of the complex viscosity.

3. The crosslinkable composition according to claim 1 containing
(1) 30-84% by weight of one or more elastomers, at least one thereof having carboxyl and/or carboxylate groups,
(2) 14-68% by weight of one or more salts of the general formula (I)

$(R_{y-})_{x/y}M^{x+}$ (I)

in which
$R^{y-}$ represents an α,β-unsaturated $C_3$-$C_{14}$-carboxylate which contains y carboxylate groups,
y may represent the values 1, 2, 3 or 4,
x is 2, 3 or 4 and
M is a divalent, trivalent or tetravalent metal, and
(3) 2-15% by weight of one or more crosslinking agents which act as free radical donors,
the sum of the components (1), (2) and (3) being less than or equal to 100% by weight,
wherein
(a) the elastomer (1) or, if a plurality of elastomers (1) is used, the mixture of all elastomers (1) together has a Mooney viscosity (ML 1+4 at 100° C.), measured according to ASTM standard D 1646, in a range of 1-35 and
(b) the crosslinkable composition has
(i) a complex viscosity η* measured in a Rubber Process Analyzer (RPA) at 60° C., 1 Hz and an amplitude of 10%, of greater than 30 000 Pas
(ii) an amplitude-dependent change of the complex viscosity, measured in the RPA at 60° C. as the ratio of η* (at 1 Hz and 10% amplitude) to η* (at 1 Hz and 100% amplitude), of greater than 1.4,
(iii) a temperature-dependent change of the complex viscosity, measured in the RPA as the ratio of η* (at 60° C., 1 Hz and 10% amplitude) to η* (at 130° C., 1 Hz and 10% amplitude), of greater than 6,
(iv) an amplitude-dependent change of the complex viscosity, measured in the RPA at 130° C. as the ratio of η* (at 1 Hz and 10% amplitude) to η* (at 1 Hz and 100% amplitude), of less than 1.5, and the values stated for the complex viscosity (η*) in all abovementioned cases (i)-(iv) indicate in each case the mathematical magnitude of the complex viscosity.

4. The crosslinkable composition according to claim 1, wherein the composition contains, as component (4), up to 84% by weight of one or more further auxiliaries, including fillers, fibres, polymers which are not covered by the definition of the elastomers (1) in claim 1, oils, stabilizers, processing auxiliaries, plasticizers, additional polymerizable monomers, dimers, trimers or oligomers, or vulcanization activators, the sum of the components (1), (2), (3) and (4) being 100% by weight.

5. The crosslinkable composition according claim 1 or 4, wherein such cross-linkable composition has
(i) a complex viscosity η*, measured in a Rubber Process Analyzer (RPA) at 60° C., 1 Hz and an amplitude of 10%, of greater than 30 000 Pas preferably of greater than 40 000 Pas,
(ii) an amplitude-dependent change of the complex viscosity, measured in the RPA at 60° C. as the ratio of η* (at 1 Hz and 10% amplitude) to η* (at 1 Hz and 100% amplitude), of greater than 1.4,
(iii) a temperature-dependent change of the complex viscosity, measured in the RPA as the ratio of η* (at 60° C., 1 Hz and 10% amplitude) to η* (at 130° C., 1 Hz and 10% amplitude), of greater than 6, and
(iv) an amplitude-dependent change of the complex viscosity, measured in the RPA at 130° C. as the ratio of η* (at 1 Hz and 10% amplitude) to η* (at 1 Hz and 100% amplitude), of less than 1.5, the values stated for the complex viscosity (η*) in all abovementioned cases (i)-(iv) indicate in each case the mathematical magnitude of the complex viscosity.

6. The crosslinkable composition according to claim 1, the elastomer (1) or the total mixture of the elastomers (1), if a plurality of elastomers (1) is used, having 0.5-15% by weight, based on 100% by weight of the elastomers (1) or based on the total mixture of the elastomers (1), if a plurality of elastomers (1) is used, of bonded carboxyl and/or carboxylate groups.

7. The crosslinkable composition according to claim 1,
1. Carboxylated nitrile rubber (also abbreviated to XNBR),
2. Hydrogenated, carboxylated nitrile rubber (also abbreviated to HXNBR),
3. Maleic anhydride ("MAH")-grafted rubbers based on EPM, EPDM, HNBR, EVA, EVM, SBR, NR or BR.
4. Carboxylated styrene-butadiene rubber (also abbreviated to XSBR),
5. AEM having free carboxyl groups, or
6. ACM having free carboxyl groups
and any desired mixtures of the abovementioned polymers being used as elastomers (1) containing carboxyl and/or carboxylate groups.

8. The crosslinkable composition according to claim 1, the Mooney viscosity (ML 1+4, measured at 100° C.), measured according to ASTM standard D 1646, of the elastomer (1) used or, if a plurality of elastomers (1) is used, of the mixture of all elastomers (1) being in a range of 2 to 25.

9. The crosslinkable composition according to claim 1, a carboxylated nitrile rubber (XNBR) which is a terpolymer of at least one α,β-unsaturated nitrile, at least one conjugated diene and at least one further termonomer containing carboxyl and/or carboxylate groups being used as component (1).

10. The crosslinkable composition according to claim 1, a carboxylated nitrile rubber (XNBR) which comprises polymers of butadiene and acrylonitrile and acrylic acid and/or methacrylic acid and/or fumaric acid and/or maleic acid and/ or the methyl, ethyl, propyl, isopropyl, n-butyl, isobutyl, n-hexyl or 2-ethylhexyl monoesters of fumaric acid and/or maleic acid and/or the methyl, ethyl, propyl, isopropyl, n-butyl, isobutyl, n-hexyl or 2-ethylhexyl esters of acrylic acid and/or methacrylic acid being used as component (1).

11. The crosslinkable composition according to claim 1, a carboxylated nitrile rubber (XNBR) which comprises polymers of butadiene and acrylonitrile and a monomer containing carboxyl groups, in particular fumaric acid, maleic acid, acrylic acid or methacrylic acid and a monomer containing carboxylate groups, in particular the methyl, ethyl, propyl, isopropyl, n-butyl, isobutyl, n-hexyl or 2-ethylhexyl monoesters of fumaric acid and maleic acid or the methyl, ethyl, propyl, isopropyl, n-butyl, isobutyl, n-hexyl or 2-ethylhexyl esters of acrylic acid or methacrylic acid being used as component (1).

12. The crosslinkable composition according to claim 1, a hydrogenated carboxylated nitrile rubber being used as component (1).

13. The crosslinkable composition according to claim 1, wherein component (1) is hydrogenated carboxylated nitrile rubber prepared by hydrogenating a carboxylated nitrile rubber (XNBR) which is a terpolymer of at least one α,β-unsaturated nitrile, at least one conjugated diene and at least one further termonomer containing carboxyl and/or carboxylate groups.

14. The crosslinkable composition according to claim 1, further elastomers (1) which have no carboxyl and/or carboxylate groups being used as component (1), in addition to one or more elastomers (1) which have carboxyl and/or carboxylate groups.

15. The crosslinkable composition according to claim 14, NBR and HNBR being used as component (1).

16. The crosslinkable composition according to claim 1, one or more salts of the general formula (I)

in which
R$^{y-}$ represents an α,β-unsaturated C$_3$-C$_{14}$-carboxylate which contains y carboxylate groups,
y may represent the values 1, 2, 3 or 4,
x is 2, 3 or 4 and
M is a divalent, trivalent or tetravalent metal and represents Mg, Ca, Zn, Fe, Al, Ti, Pb, B, Sc, Yt, Sn or Haf,
being used as component (2).

17. The crosslinkable composition according to claim 1, in component (2) the radical R$^{y-}$ in the general formula (I) is representing an α,β-unsaturated C$_3$-C$_8$-carboxylate which contains y carboxylate groups, it being possible for y to assume the value 1, 2, 3 or 4 and R$^{y-}$ in the general formula (I) preferably representing acrylate, methacrylate, crotonate, isocrotonate, sorbate, fumarate or maleate or mixtures thereof.

18. The crosslinkable composition according to claim 1, one or more crosslinking agents in the form of peroxide compounds, azides, photoinitiators, redox initiators or mixtures of the abovementioned being used as component (3).

19. The crosslinkable composition according to claim 1, peroxide compounds from the following group being used as component (3): bis(2,4-dichlorobenzoyl)peroxide, dibenzoyl peroxide, bis(4-chlorobenzoyl)peroxide, 1,1-bis(t-butylperoxy)-3,3,5-trimethylcyclohexane, tert-butyl perbenzoate, 2,2-bis(tert-butylperoxy)butene, 4,4-di-tert-butylperoxynonyl valerate, dicumyl peroxide, 2,5-dimethyl-2,5-di(tert-butylperoxy)hexane, tert-butyl cumyl peroxide, 1,3-bis(tert-butylperoxyisopropyl)benzene, di-tert-butyl peroxide, 2,5-dimethyl-2,5-di(tert-butylperoxy)hexyne, tert-butyl hydroperoxide, hydrogen peroxide, methyl ethyl ketone peroxide, lauroyl peroxide, decanoyl peroxide, 3,5,5-trimethylhexanoyl peroxide, di(2-ethylhexyl) peroxydicarbonate, poly(tert-butyl peroxycarbonate), ethyl 3,3-di(tert-butylperoxy) butyrate, ethyl 3,3-di(tert-amylperoxy)butyrate, n-butyl 4,4-di(tert-butylperoxy)valerate, 2,2-di(tert-butylperoxy)butane, 1,1-di(tert-butylperoxy)cyclohexane, 3,3,5-trimethylcyclohexane, 1,1-di(tert-amylperoxy)cyclohexane, tert-butyl peroxybenzoate, tert-butyl peroxyacetate, tert-butyl peroxy-3,5,5-trimethylhexanoate, tert-butyl peroxyisobutyrate, tert-butyl peroxy-2-ethylhexanoate, tert-butyl peroxypivalate, tert-amyl peroxypivalate, tert-butyl peroxyneodecanoate, cumyl peroxyneodecanoate, 3-hydroxy-1,1-dimethylbutyl peroxyneodecanoate, tert-butyl peroxybenzoate, tert-butyl peroxyacetate, tert-amyl peroxy-3,5,5-trimethylhexanoate, tert-butyl peroxyisobutyrate, tert-butyl peroxy-2-ethylhexanoate, cumyl peroxyneodecanoate, 3-hydroxy-1,1-dimethylbutyl peroxyneodecanoate, 2,5-dimethyl-2,5-di(tert-butylperoxy)hexyne (3-di-tert-amyl)peroxide, 2,5-dimethyl-2,5-di(tert-butylperoxy)hexane, tert-amyl hydroperoxide, cumol hydroperoxide, 2,5-dimethyl-2,5-di(hydroperoxy) hexane, diisopropylbenzene monohydroperoxide and potassium peroxodisulphate.

20. The crosslinkable composition according to claim 1, 2,2-azobismethylethylacetonitrile as an azide being used as component (3).

21. The crosslinkable composition according to claim 1, a photoinitiator from the following group being chosen as component (3): benzoin, benzoin methyl ether, benzoin ethyl ether, benzoin isopropyl ether, benzoin n-butyl ether, benzoin isobutyl ether, benzoylphenylcarbinol, methylphenyl glyoxylate, 4,4'-diazidobiphenyl, 4,4'-diazidobenzophenone, 4,4'-diazidobiphenyl oxide, 4,4'-diazido-disulphonylbiphenyl, azidobenzene, 4-azidobenzoic acid, 1,2-bis(4-azidophenyl) ethylene, 4-aminophenyl-4'-azidophenylmethane, 2,6-di(4'-azidobenzal)cyclohexanone, sodium 4,4'-diazidostilbene-2, 2'-disulphonate, benzophenone, benzophenone oxime, acetophenone, bromoacetophenone, cyclohexanone, diphenyl monosulphide, dibenzothiazolyl disulphide, s-acyl dithiocarbamate, m,m'-azoxystyrene, benzyl dimethyl ketal, 4-methylbenzophenone, 4-phenylbenzophenone, ethyl 4-dimethylaminobenzoate (EPD), 2-hydroxy-2-methylphenylpropan-1-one, isopropylthioxanthone (ITX) and 2-methyl-1-(4-methylthiophenyl)-2-morpholinopropan-1-one.

22. Crosslinkable composition according to claim 1, a redox initiator from the following group being chosen as component (3): Fe(II)/hydroperoxide, peroxide/tertiary amine, peroxodisulphate/thiosulphate, hydroperoxide/thiosulphate.

23. A process for the preparation of the crosslinkable composition according to claim 1 comprising mixing all components (1)-(3) and optionally (4).

24. The process for the preparation of crosslinked elastomers, at least one of which has carboxyl and/or carboxylate groups, comprising subjecting the crosslinkable composition according to claim 1 to energy input, preferably in the form of thermal energy or radiation energy.

25. A process for using the crosslinkable composition according to claim 1 to prepare adhesion layers on cold components comprising applying the crosslinking composition on a cold component.

26. A process for using the crosslinkable composition according to claim 1 as impregnating material comprising applying the crosslinkable composition to a substrate and then vulcanizing this composition by energy input.

27. A process for using the crosslinkable composition according to claim 1 to prepare belts, comprising applying the crosslinkable composition together with other rubber components and/or flexible fabrics and/or cords to a drum having the negative form of the belt and subjecting the so covered drum to a vulcanization.

28. The process according to claim 27 to prepare toothed belts or drive belts.

29. A process for using the crosslinkable composition according to claim 1 to prepare roll covers comprising applying the crosslinkable composition to a roll body and then vulcanizing this composition on the roll-body.

30. A process for using the crosslinkable composition according to claim 1 to prepare thermoplastic vulcanizates comprising subjecting the crosslinkable composition and one or more thermoplastic polymers to a vulcanization.

31. A process for using the crosslinkable composition according to claim 1 to prepare shaped articles comprising subjecting the crosslinkable composition to an injection moulding or compression moulding.

32. The crosslinkable composition according to claim 1, wherein the composition contains, as component (4), being in a range of 4-64% by weight of one or more further auxiliaries, including fillers, fibres, polymers which are not covered by the definition of the elastomers (1) in claim 1, oils, stabilizers, processing auxiliaries, plasticizers, additional polymerizable monomers, dimers, trimers or oligomers, or vulcanization activators, the sum of the components (1), (2), (3) and (4) being 100% by weight.

33. The crosslinkable composition according to claim 1, wherein the composition contains, as component (4), being in a range of 10-40% by weight of one or more further auxiliaries, including fillers, fibres, polymers which are not covered by the definition of the elastomers (1) in claim 1, oils, stabilizers, processing auxiliaries, plasticizers, additional polymerizable monomers, dimers, trimers or oligomers, or vulcanization activators, the sum of the components (1), (2), (3) and (4) being 100% by weight.

34. The crosslinkable composition according to claim 1, the elastomer (1) or the total mixture of the elastomers (1), if a plurality of elastomers (1) is used, being in a range of 0.5-10% by weight, based on 100% by weight of the elastomers (1) or based on the total mixture of the elastomers (1), if a plurality of elastomers (1) is used, of bonded carboxyl and/or carboxylate groups.

35. The crosslinkable composition according to claim 1, the elastomer (1) or the total mixture of the elastomers (1), if a plurality of elastomers (1) is used, being in a range of 1-7% by weight, based on 100% by weight of the elastomers (1) or based on the total mixture of the elastomers (1), if a plurality of elastomers (1) is used, of bonded carboxyl and/or carboxylate groups.

36. The crosslinkable composition according to claim 1, the elastomer (1) or the total mixture of the elastomers (1), if a plurality of elastomers (1) is used, being in a range of 1.5-6% by weight, based on 100% by weight of the elastomers (1) or based on the total mixture of the elastomers (1), if a plurality of elastomers (1) is used, of bonded carboxyl and/or carboxylate groups.

37. The crosslinkable composition according to claim 1, the Mooney viscosity (ML 1+4, measured at 100° C.), measured according to ASTM standard D 1646, of the elastomer (1) used or, if a plurality of elastomers (1) is used, of the mixture of all elastomers (1) being in a range of 5 to 20.

38. The crosslinkable composition according to claim 1, wherein component (1) is a hydrogenated carboxylate nitrile rubber prepared by hydrogenating a carboxylated nitrile rubber (XNBR) which comprises polymers of butadiene and acrylonitrile and acrylic acid and/or methacrylic acid and/or fumaric acid and/or maleic acid and/or the methyl, ethyl, propyl, isopropyl, n-butyl, isobutyl, n-hexyl and 2-ethylhexyl monoesters of fumaric acid and/or maleic acid and/or the methyl, ethyl, propyl, isopropyl, n-butyl, isobutyl, n-hexyl and 2-ethylhexyl esters of acrylic acid and/or methacrylic acid.

39. The crosslinkable composition according to claim 1, wherein component (1) is a hydrogenated carboxylated nitrile rubber prepared by hydrogenating a carboxylated nitrile rubber (XNBR) which comprises polymers of butadiene and acrylonitrile and a monomer containing carboxyl groups, in particular fumaric acid, maleic acid, acrylic acid or methacrylic acid, and a monomer containing carboxylate groups, in particular the methyl, ethyl, propyl, isopropyl, n-butyl, isobutyl, n-hexyl and 2-ethylhexyl monomer of fumaric acid or maleic acid or the methyl, ethyl, propyl, isopropyl, n-butyl, isobutyl, n-hexyl and 2-ethylhexyl esters of acrylic acid or methacrylic acid.

* * * * *